(12) United States Patent
Roddy et al.

(10) Patent No.: US 6,981,182 B2
(45) Date of Patent: Dec. 27, 2005

(54) METHOD AND SYSTEM FOR ANALYZING FAULT AND QUANTIZED OPERATIONAL DATA FOR AUTOMATED DIAGNOSTICS OF LOCOMOTIVES

(75) Inventors: Nicholas E. Roddy, Clifton Park, NY (US); Jason A. Dean, Erie, PA (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 10/063,601

(22) Filed: May 3, 2002

(65) Prior Publication Data

US 2003/0208706 A1    Nov. 6, 2003

(51) Int. Cl.$^7$ .............................................. G06F 11/34
(52) U.S. Cl. ........................... 714/47; 714/37; 714/48; 701/29; 702/183; 702/185
(58) Field of Search .............................. 714/47, 25, 37, 714/48, 26; 701/29, 35, 36; 700/26, 52; 702/182–188

(56) References Cited

U.S. PATENT DOCUMENTS

| | | | |
|---|---|---|---|
| 6,115,653 A * | 9/2000 | Bergstrom et al. ............. | 701/29 |
| 6,185,549 B1 * | 2/2001 | Rastogi et al. ................. | 706/45 |
| 6,243,628 B1 | 6/2001 | Bliley et al. | |
| 6,256,594 B1 * | 7/2001 | Yamamoto et al. ......... | 702/185 |
| 6,263,265 B1 | 7/2001 | Fera | |
| 6,301,531 B1 | 10/2001 | Pierro et al. | |
| 6,324,659 B1 | 11/2001 | Pierro | |
| 6,336,065 B1 * | 1/2002 | Gibson et al. ................. | 701/29 |
| 6,338,152 B1 | 1/2002 | Fera et al. | |
| 6,343,236 B1 * | 1/2002 | Gibson et al. ................. | 700/79 |
| 6,405,108 B1 | 6/2002 | Patel et al. | |

(Continued)

OTHER PUBLICATIONS

Roman Trobec and Izidor Jerebic, "Optimization Of Diagnostic Examination," Joint International Conference On Vector And Parallel Processing, Berlin De 1994, pp. 761-772, XP-000974309.

*Primary Examiner*—Bryce P. Bonzo
*Assistant Examiner*—Philip Guyton
(74) *Attorney, Agent, or Firm*—William Scott Andes; Enrique J. Mora; Beusse, Brownlee, Wolter, Mora & Maire

(57) ABSTRACT

Method and system for processing fault log data from a machine comprising a plurality of respective pieces of equipment are provided. Operational parameter data indicative of operational and/or environmental conditions for the respective pieces of equipment is further processed. The method allows collecting fault log data comprising a plurality of faults from any malfunctioning piece of equipment. The method further allows collecting operational parameter data relatable to each respective time of occurrence of the plurality of faults from the malfunctioning equipment. Respective identifying actions allow identifying a plurality of distinct faults in the fault log data and a plurality of data buckets indicative of respective levels of quantization of each operational parameter. At least one distinct fault cluster is generated from the plurality of distinct faults. Each generated fault cluster is related a respective quantization level of at least one operational parameter to provide at least one fault cluster that may be configurable in at least one of the following cluster configurations: a stand-alone fault cluster configuration and a cluster configuration enhanced with quantized operational parameter data. A plurality of weighted repair and distinct fault cluster combinations enhanceable with quantized operational parameter data is generated. At least one repair for the at least one fault cluster enhanceable with quantized operational parameter data is generated using the plurality of weighted repair and distinct fault cluster combinations enhanceable with quantized operational parameter data.

12 Claims, 13 Drawing Sheets

U.S. PATENT DOCUMENTS

| | | | |
|---|---|---|---|
| 6,415,395 B1 * | 7/2002 | Varma et al. | 714/37 |
| 6,480,770 B1 * | 11/2002 | Wischmeyer | 701/29 |
| 6,598,179 B1 * | 7/2003 | Chirashnya et al. | 714/37 |
| 6,615,367 B1 | 9/2003 | Unkle et al. | |
| 6,622,264 B1 | 9/2003 | Bliley et al. | |
| 6,625,589 B1 | 9/2003 | Varma et al. | |
| 6,629,095 B1 * | 9/2003 | Wagstaff et al. | 707/5 |
| 6,634,000 B1 | 10/2003 | Jammu et al. | |
| 6,636,771 B1 | 10/2003 | Varma et al. | |
| 6,651,034 B1 | 11/2003 | Hedlund et al. | |
| 6,725,398 B1 | 4/2004 | Varma et al. | |

* cited by examiner

FIG. 2A

| CUST | UNIT | DATE | CODE | DESC | DESC1 |
|---|---|---|---|---|---|
| RR | 3500 | Sun Jul 13 1997 | 1111 | Piping Fittings-Engine Intercooler | REPAIRED WATER LEAK AT TOP OF RT |
| RR | 3500 | Tue Jul 01 1997 | 2222 | Lube Oil-Engine | WATER IN LUBE OIL CHANGED OIL |
| RR | 3500 | Sat Jun 28 1997 | 3333 | BRP-Battery Charger Regulator Panel | NO BATTCHARGE-REPL BPR |
| RR | 3500 | Wed Jun 18 1997 | 4444 | EFI-High Pressure Pump | REPLACE 3 HP PUMPS NOT FOR FIRING |
| RR | 3500 | Mon Jun 09 1997 | 5555 | Turbocharger Assembly General-Eng | TURBO DRAGSSECONDARY DAMAGE-RPL |
| RR | 3500 | Sat May 24 1997 | 6666 | Cylinder Assembly General-Eng | REPL R6 PA FOR SECONDARY DAMAGE |
| RR | 3500 | Sat May 24 1997 | 7777 | Cylinder Assembly General-Eng | TRIPPING COP PISTON FAILURE CO |

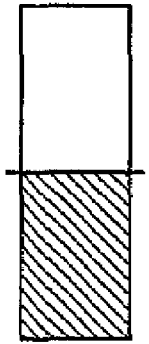

| FAILMODE_DESC | SUB_ASSEMBLY_CODE | MAIN_ASSEMBLY_CODE |
|---|---|---|
| LEAKING FLUID/AIR | ENGINTCOOL | ENGINE |
| CONTAMINATED | LUBEOIL | ENGISUPT |
| UNKNOWNUNDETERMINED | POWERPANEL | POWERELN |
| UNKNOWNUNDETERMINED | ENGFUELINJ | ENGINE |
| UNKNOWNUNDETERMINED | ENGTURBO | ENGINE |
| UNKNOWNUNDETERMINED | POWERASSY | ENGINE |
| UNKNOWNUNDETERMINED | POWERASSY | ENGINE |

| 42 | 44 | 45 | 46 | | | | |
|---|---|---|---|---|---|---|---|
| RR | 3500 | 03-may-1997 | 1000 | 90623.06 | 90637.20 | 0.0 | CS | 0 |
| RR | 3500 | 03-may-1997 | 2000 | 90623.06 | 90637.20 | 0.0 | CS | 0 |
| RR | 3500 | 22-may-1997 | 3000 | 91067.93 | 91067.93 | 11.4 | F | 5 |
| RR | 3500 | 22-may-1997 | 4000 | 91067.93 | 91067.93 | 11.4 | F | 5 |
| RR | 3500 | 22-may-1997 | 5000 | 91068.70 | 91068.71 | 16.5 | F | 4 |
| RR | 3500 | 22-may-1997 | 6000 | 91068.70 | 91068.71 | 16.5 | F | 4 |
| RR | 3500 | 22-may-1997 | 7000 | 91068.71 | 0.00 | 17.9 | F | 1 |
| RR | 3500 | 22-may-1997 | 8000 | 91068.71 | 0.00 | 17.9 | F | 1 |
| RR | 3500 | 22-may-1997 | 9000 | 91069.55 | 91069.55 | 23.1 | F | 5 |
| RR | 3500 | 22-may-1997 | 1111 | 91069.55 | 91069.55 | 23.1 | F | 5 |
| RR | 3500 | 22-may-1997 | 2222 | 91069.56 | 91069.58 | 27.4 | F | 6 |

↙ 40

| | | | | | | | | | | | |
|---|---|---|---|---|---|---|---|---|---|---|---|
| 0 | 1 | 2 | 0 | 101 | 97 | R | E | 0 | 0 | | Intake Manifold Air Too |
| 0 | 1 | 2 | 0 | 101 | 97 | R | E | 0 | 0 | | Intake Manifold Air Too |
| 992 | 288 | 4706 | 202 | 177 | 182 | M | E | F | 0 | 6AB_M_S_ | COP Trip |
| 992 | 288 | 4706 | 202 | 177 | 182 | M | E | F | 0 | 6AB_M_S_ | COP Trip |
| 885 | 338 | 2864 | 133 | 175 | 186 | M | E | 2 | 4 | 6AB_M_S_ | COP Trip |
| 885 | 338 | 2864 | 133 | 175 | 186 | M | E | 2 | 4 | 6AB_M_S_ | COP Trip |
| 458 | 6 | 0 | 0 | 174 | 186 | R | E | F | 4 | EAB | Fault Reset While in Lc |
| 458 | 6 | 0 | 0 | 174 | 186 | R | E | F | 4 | EAB | Fault Reset While in Lc |
| 992 | 474 | 3005 | 148 | 180 | 187 | M | E | 2 | 0 | R 6AB_M_S_ | COP Trip |
| 992 | 474 | 3005 | 148 | 180 | 187 | M | E | 2 | 0 | R 6AB_M_S_ | COP Trip |
| 1010 | 506 | 2405 | 128 | 179 | 189 | M | E | F | 4 | 6AB_M_S_ | COP Trip |

FIG. 4

Fault Log Data with Operational Parameters Data (50, 52)

Fault Log Data with Quantized Operational Parameter Data (60, 62)

| | | | | | | | | |
|---|---|---|---|---|---|---|---|---|
| 7096-00 | 1020 | 2040 | 3000 | 4030 | 5070 | 6080 | 7000 | 8020 | 9020. |
| 7096-03 | 1020 | 2040 | 3020 | 4030 | 5070 | 6080 | 7000 | 8020 | 9020. |
| 7097-00 | 1060 | 2040 | 3020 | 4040 | 5070 | 6080 | 7010 | 8020 | 9020. |
| 7120-00 | 1020 | 2040 | 3040 | 4040 | 5070 | 6080 | 7010 | 8020 | 9020. |
| C611-00 | 1020 | 2040 | 3020 | 4030 | 5070 | 6090 | 7020 | 8020 | 9040. |
| C611-00 | 1020 | 2040 | 3060 | 4030 | 5070 | 6080 | 7000 | 8020 | 9040. |
| 7097-00 | 1030 | 2040 | 3060 | 4030 | 5070 | 6080 | 7020 | 8020 | 9040. |
| 7096-00 | 1030 | 2040 | 3070 | 4030 | 5070 | 6090 | 7000 | 8020 | 9040. |

Exemplary Fault Cluster Combinations Enhanced with Quantized operational Parameters Data (70)

7096-00 1020 , 7096-03 1020
7096-00 1020 , 7097-00 1060
7096-00 1020 , 7120-00 1020
7096-00 1020 , C611-00 1020

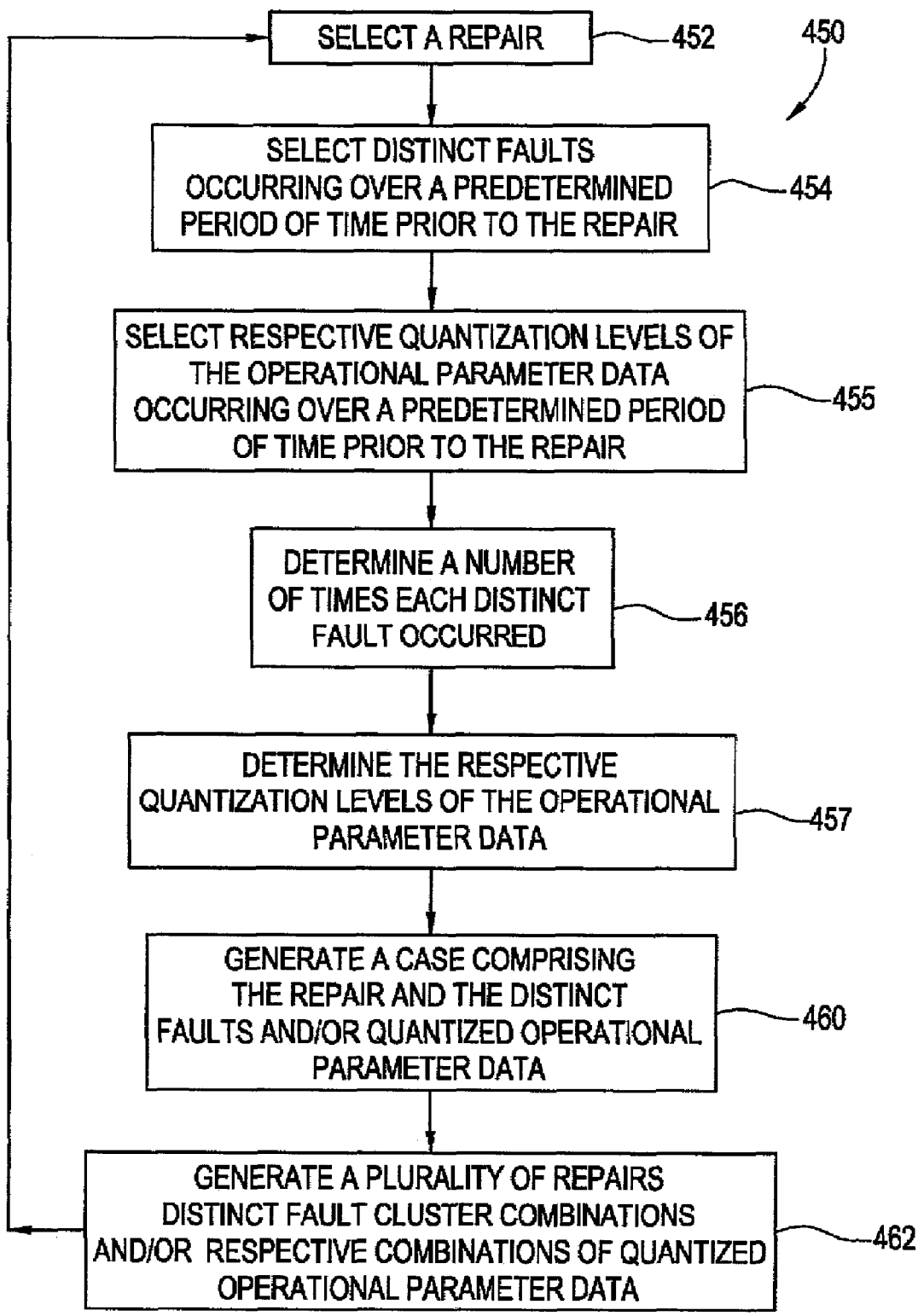

METHOD AND SYSTEM FOR ANALYZING FAULT AND QUANTIZED OPERATIONAL DATA FOR AUTOMATED DIAGNOSTICS OF LOCOMOTIVES

BACKGROUND OF INVENTION

The present invention relates generally to diagnostics of railroad locomotives and other self-powered transportation equipment, and, more specifically, to system and method for hybrid processing of quantized operational parameter data and fault log data to facilitate automated analysis of machine equipment undergoing diagnostics.

A machine, such as a locomotive or other complex systems used in industrial processes, medical imaging, telecommunications, aerospace applications, power generation, etc., includes elaborate controls and sensors that generate faults when anomalous operating conditions of the machine are encountered. Typically, a field engineer will look at a fault log and determine whether a repair is necessary.

Approaches like neural networks, decision trees, etc., have been employed to learn over input data to provide prediction, classification, and function approximation capabilities in the context of diagnostics. Often, such approaches have required structured and relatively static and complete input data sets for learning, and have produced models that resist real-world interpretation.

Another approach, Case Based Reasoning (CBR), is based on the observation that experiential knowledge (memory of past experiences or cases) is applicable to problem solving as learning rules or behaviors. CBR relies on relatively few pre-processing of raw knowledge, focusing instead on indexing, retrieval, reuse, and archival of cases. In the diagnostic context, a case generally refers to a problem/solution description pair that represents a diagnosis of a problem and an appropriate repair. CBR assumes cases described by a fixed, known number of descriptive attributes. Conventional CBR systems assume a corpus of fully valid or "gold standard" cases that new incoming cases can be matched against.

U.S. Pat. No. 5,463,768 discloses an approach which uses error log data and assumes predefined cases with each case associating an input error log to a verified, unique diagnosis of a problem. In particular, a plurality of historical error logs are grouped into case sets of common malfunctions. From the group of case sets, common patterns, i.e., consecutive rows or strings of data, are labeled as a block. Blocks are used to characterize fault contribution for new error logs that are received in a diagnostic unit. Unfortunately, for a continuous fault code stream where any or all possible fault codes may occur from zero to any finite number of times and where the fault codes may occur in any order, predefining the structure of a case is nearly impossible.

U.S. patent application Ser. No. 09/285,612, assigned to the same assignee of the present invention, discloses system and method for processing historical repair data and fault log data, which is not restricted to sequential occurrences of fault log entries and which provides weighted repair and distinct fault cluster combinations, to facilitate analysis of new fault log data from a malfunctioning machine. Further, U.S. Pat. No. 6,343,236, assigned to the same assignee of the present invention, discloses system and method for analyzing new fault log data from a malfunctioning machine in which the system and method are not restricted to sequential occurrences of fault log entries, and wherein the system and method predict one or more repair actions using predetermined weighted repair and distinct fault cluster combinations. Additionally, U.S. Pat. No. 6,336,065, assigned to the same assignee of the present invention, provides system and method that uses snapshot observations of operational parameters from the machine in combination with the fault log data in order to further enhance the predictive accuracy of the diagnostic algorithms used therein. That invention further provides noise reduction filters, to substantially eliminate undesirable noise, e.g., unreliable or useless information that may be present in the fault log data and/or the operational parameter data. This noise reduction allows increasing the probability of early detection of actual incipient failures in the machine, as well as decreasing the probability of falsely declaring non-existent failures.

U.S. patent application Ser. No. 09/688,105, assigned in common to the assignee of the present invention, provides process and system that uses anomaly definitions based on continuous parameters to generate diagnostics and repair data. The anomaly definitions in this case are different from faults in the sense that the information can be taken in a wider time window, whereas faults, or even fault data combined with snapshot data, are generally based on generally discrete behavior occurring at one instance in time. The anomaly definitions, however, may be analogized to virtual faults and thus, such anomaly definitions can be learned using the same diagnostics algorithms that can be used for processing fault log data.

It is believed that the inventions disclosed in the foregoing patent applications or patents provide substantial advantages and advancements in the art of computerized diagnostics. It would be desirable, however, to provide system and method that allows a field or diagnostic engineer or any other personnel involved in maintaining and/or servicing the machine to systematically analyze the fault log data together with quantized operational parameter data so as to identify respective indications and/or respective combinations of indications that otherwise could be missed. It will be shown that fault log data enhanced with quantized operational parameter data provides useful information for even more reliable and accurate detection of incipient failures. For example, it would be desirable to even more accurately identify any such anomalies and/or combinations so that such maintenance and/or service personnel is able to proactively make repair recommendations and thus avoid loss of good will with clients as well as costly delays that could result in the event of a mission failure of the machine. An example of a mission failure would be a failed locomotive unable to deliver cargo to its destination and possibly causing traffic gridlock in a given railtrack. It would be further desirable to identify data buckets indicative of respective levels of quantization for each operational parameter. It would be also desirable to configure the data buckets to capture and distinguish statistically-measurable influences on the performance of a given piece of equipment based on the quantization level of each respective operational parameter. This would quickly allow service personnel to compare any new fault log data together with quantized operational parameter data, as may be downloaded from the machine, with prior fault log data of the same machine so as to be able to issue even more accurate and reliable repair recommendations to the entity responsible for operating the locomotive.

SUMMARY OF INVENTION

Generally, the present invention fulfills the foregoing needs by providing in one aspect thereof, a method for processing fault log data from a machine comprising a plurality of respective pieces of equipment. The method further processes operational parameter data indicative of operational and/or environmental conditions for the respective pieces of equipment. The method allows collecting fault log data comprising a plurality of faults from any malfunctioning piece of equipment. The method further allows collecting operational parameter data relatable to each respective time of occurrence of the plurality of faults from the malfunctioning equipment. Respective identifying actions allow identifying a plurality of distinct faults in the fault log data and a plurality of data buckets indicative of respective levels of quantization of each operational parameter. At least one distinct fault cluster is generated from the plurality of distinct faults. Each generated fault cluster is related a respective quantization level of at least one operational parameter to provide at least one fault cluster that may be configurable in at least one of the following cluster configurations: a stand-alone fault cluster configuration and a cluster configuration enhanced with quantized operational parameter data. A plurality of weighted repair and distinct fault cluster combinations enhanceable with quantized operational parameter data is generated. At least one repair for the at least one fault cluster enhanceable with quantized operational parameter data is generated using the plurality of weighted repair and distinct fault cluster combinations enhanceable with quantized operational parameter data.

The present invention further fulfills the foregoing needs by providing in another aspect thereof, a method for processing fault log data from a machine comprising a plurality of respective pieces of equipment. The method further processes operational parameter data indicative of operational and/or environmental conditions for the respective pieces of equipment. The method allows respective collecting actions for collecting fault log data comprising a plurality of faults from any malfunctioning piece of equipment, and collecting operational parameter data relatable to each respective time of occurrence of the plurality of faults from the malfunctioning equipment. The method further allows respective identifying actions for identifying a plurality of distinct faults in the fault log data, and a plurality of data buckets indicative of respective levels of quantization of each operational parameter, wherein each data bucket is configured to distinguish measurable influences on the performance of a given piece of equipment based on to the quantization level of each operational parameter. A generating action allows generating at least one distinct fault cluster from the plurality of distinct faults. A relating action allows relating to each generated fault cluster a respective quantization level of at least one operational parameter to provide at least one fault cluster that may be configurable in at least one of the following cluster configurations: a stand-alone fault cluster configuration and a cluster configuration enhanced with quantized operational parameter data. A predicting action allows predicting at least one repair for the at least one fault cluster enhanced with quantized operational parameter data using a plurality of weighted repair and distinct fault cluster combinations enhanceable with quantized operational parameter data.

In another aspect thereof, the present invention provides a system for processing fault log data from a machine comprising a plurality of respective pieces of equipment. The system further processes operational parameter data indicative of operational and/or environmental conditions for the respective pieces of equipment. The system includes a database for collecting fault log data comprising a plurality of faults from any malfunctioning piece of equipment. The system further includes a database for collecting operational parameter data relatable to each respective time of occurrence of the plurality of faults from the malfunctioning equipment. A processor is configured to identify a plurality of distinct faults in the fault log data. A processor is configured to identify a plurality of data buckets indicative of respective levels of quantization of each operational parameter. A processor is configured to generate at least one distinct fault cluster from the plurality of distinct faults. A processor is configured to relate to each generated fault cluster a respective quantization level of at least one operational parameter to provide at least one fault cluster that may be configurable in at least one of the following cluster configurations: a stand-alone fault cluster configuration and a cluster configuration enhanced with quantized operational parameter data. A processor is configured to generate a plurality of weighted repair and distinct fault cluster combinations enhanceable with quantized operational parameter data. A processor is configured to identify at least one repair for the at least one fault cluster enhanceable with quantized operational parameter data using the plurality of weighted repair and distinct fault cluster combinations enhanceable with quantized operational parameter data.

In yet another aspect thereof, the present invention provides an article of manufacturing made up of a computer-readable medium including computer-readable program code for causing a computer to process fault log data from a machine comprising a plurality of respective pieces of equipment. The computer-readable program code further causes the computer to process operational parameter data indicative of operational and/or environmental conditions for the respective pieces of equipment. The computer-readable program code in such article of manufacturing is made up of:

computer-readable program code configurable to collect fault log data comprising a plurality of faults from any malfunctioning piece of equipment;

computer-readable program code configurable to collect operational parameter data relatable to each respective time of occurrence of the plurality of faults from the malfunctioning equipment;

computer-readable program code configurable to identify a plurality of distinct faults in the fault log data;

computer-readable program code configurable to identify a plurality of data buckets indicative of respective levels of quantization of each operational parameter, wherein each data bucket is configurable to distinguish measurable influences on the performance of a given piece of equipment based on to the quantization level of each operational parameter;

computer-readable program code configurable to generate at least one distinct fault cluster from the plurality of distinct faults;

computer-readable program code configurable to relate to each generated fault cluster a respective quantization level of at least one operational parameter to provide at least one fault cluster configurable in at least one of the following cluster configurations: a stand-alone fault cluster configuration and a cluster configuration enhanced with quantized operational parameter data; and computer-readable program code configurable to predict at least one repair for the at least one fault cluster enhanceable with quantized operational parameter data using a plurality of weighted repair and distinct fault cluster combinations enhanceable with quantized operational parameter data.

BRIEF DESCRIPTION OF DRAWINGS

The features and advantages of the present invention will become apparent from the following detailed description of the invention when read with the accompanying drawings in which:

FIG. 4 is an illustration of exemplary hybrid data including in part fault log data and quantized operational parameter data;

FIG. 12 is flow chart describing steps for generating a plurality of respective cases, including predetermined repairs, fault cluster combinations and/or quantized operational parameter data for each case.

DETAILED DESCRIPTION

Figure 1:
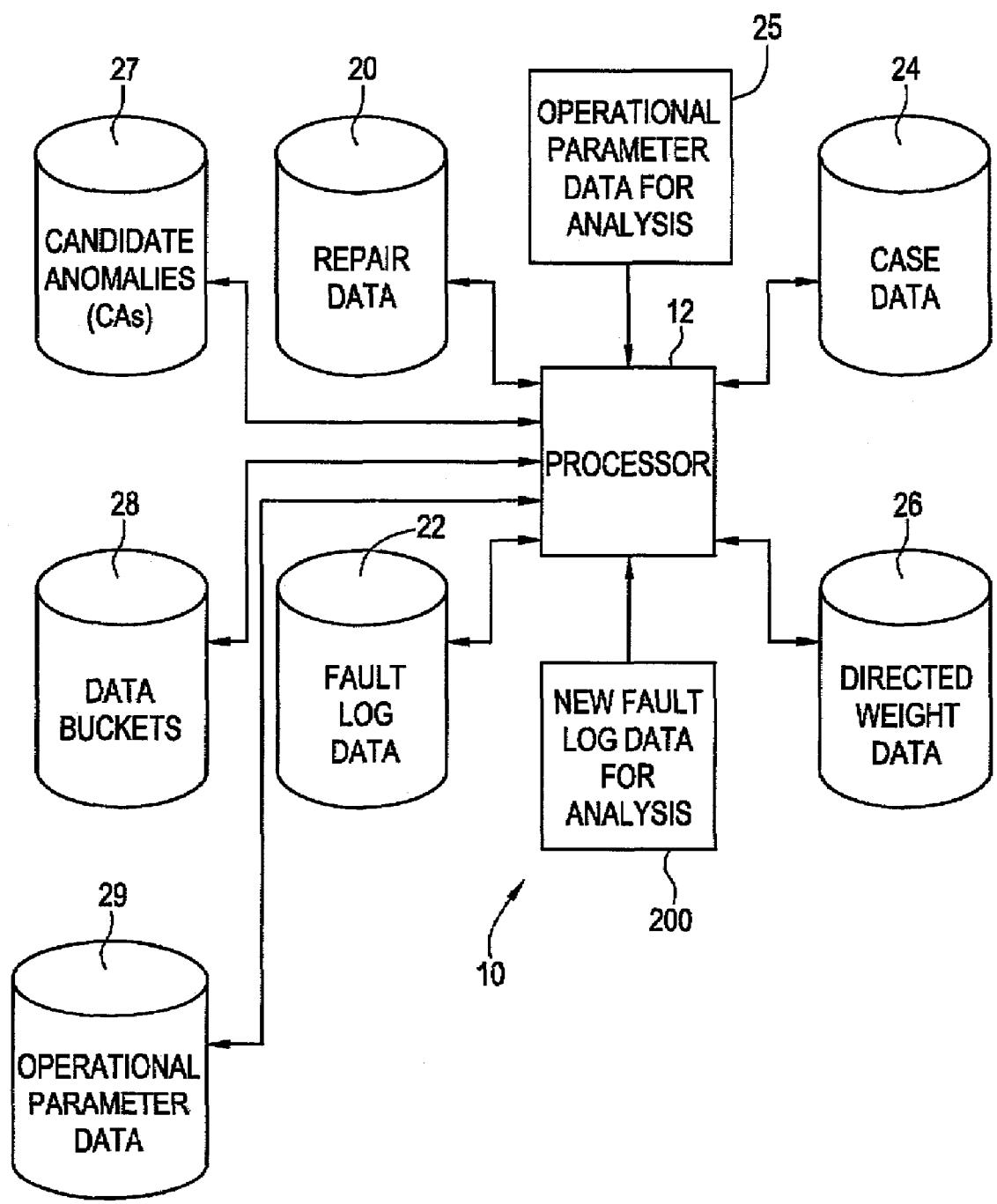
FIG. 1 is one embodiment of a block diagram of a system of the present invention that uses a processor for processing operational parameter data and fault log data from railroad locomotives and other large landselftransport equipment and diagnosing malfunctioning equipment.

FIG. 1 diagrammatically illustrates one exemplary embodiment of a diagnostic system 10 embodying aspects of the present invention. System 10 provides a process for automatically harvesting or mining repair data comprising a plurality of related and unrelated repairs and fault log data comprising a plurality of faults, from one or more machines, such as railroad locomotives and other large land-based, self-powered transport equipment, and generating weighted repair and distinct fault cluster combinations which are diagnostically significant predictors to facilitate analysis of new fault log data from a malfunctioning locomotive. In one aspect of the invention, system 10 allows for hybridly analyzing the fault log data jointly with quantized operational parameters from the machine. The quantized operational parameters may be based on a plurality of data buckets indicative of respective levels of quantization of each operational parameter. Each data bucket may be configured to capture and distinguish statistically-measurable influences on the performance of a given piece of equipment based on the quantization level of each respective operational parameter.

Although the present invention is described with reference to a locomotive, system 10 can be used in conjunction with any machine in which operation of the machine is monitored, such as a chemical, an electronic, a mechanical, or a microprocessor machine.

Exemplary system 10 includes a processor 12 such as a computer (e.g., UNIX workstation) having a hard drive, input devices such as a keyboard, a mouse, magnetic storage media (e.g., tape cartridges or disks), optical storage media (e.g., CD and output devices such as a display and a printer. Processor 12 is operably connected to and processes data contained in a repair data storage unit 20 and a fault log data storage unit 22. Processor 12 is further respectively connected to process candidate anomalies stored in a storage unit 28.

Figure 2B:
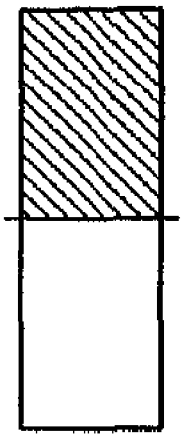
FIG. 2 is an illustration of exemplary repair log data.

Repair data storage unit 20 includes repair data or records regarding a plurality of related and unrelated repairs for one or more locomotives. FIG. 2, made up of FIGS. and 2B, shows an exemplary portion 30 of the repair data contained in repair data storage unit 20. The repair data may include a customer identification number 32, a locomotive identification or unit number 33, the date 34 of the repair, the repair code 35, a repair code description 36, a description of the actual repair 37 performed, etc.

Figure 3A:
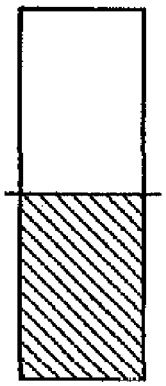
FIG. 3 is an illustration of exemplary fault log data.
Figure 3B:
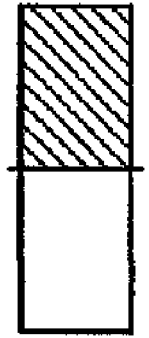

Fault log data storage unit 22 includes fault log data or records regarding a plurality of faults occurring prior to the repairs for the one or more locomotives. FIG. 3, made up of FIGS. 3A and 3B, shows an exemplary portion 40 of the fault log data contained in fault log data storage unit 22. The fault log data may include a customer identification number 42, a locomotive identification number or unit 44, the date 45 when the fault occurred, a fault code 46, a fault code description 48, etc.

As suggested above, additional data used in the analysis of the present invention include operational parameter data 25 (FIG. 1) indicative of a plurality of operational parameters or operational conditions of the machine. The operational parameter data may be obtained from various sensor readings or observations, e.g., temperature sensor readings, pressure sensor readings, electrical sensor readings, engine power readings, etc. Examples of operational conditions of the machine may include whether the locomotive is operating in a motoring or in a dynamic braking mode of operation, whether any given subsystem in the locomotive is undergoing a self-test, whether the locomotive is stationary, whether the engine is operating under maximum load conditions, etc. It will be appreciated by those skilled in the art that the repair data storage unit, the fault log data storage unit, and the operational parameter data storage unit may respectively contain repair data, fault log data and operational parameter data for a plurality of different locomotives. It will be further appreciated that the operational parameter data may be made up at snapshot observations, ie., substantially instantaneous readings or discrete samples of the respective values of the operational parameters from the locomotive. Preferably, the snapshot observations are temporally aligned relative to the time when respective faults are generated or logged in the locomotive. For example, the temporal alignment allows for determining the respective values of the operational parameters from the locomotive prior, during or after the logging of respective faults in the locomotive. The operational parameter data need not be limited to snapshot observations since substantially continuous observations over a predetermined period of time before or after a fault is logged can be similarly obtained. This feature may be particularly desirable if the system is configured for detection of trends that may be indicative of incipient failures in the locomotive.

FIG. 4 shows an exemplary data file 50 that combines fault log data and operational parameter data 52, such as locomotive speed, engine water temperature, engine oil temperature, call status, etc. FIG. 4 further illustrates an exemplary data file 60 including fault log data with quantized operational parameter data 62 that may be conveniently used to enhance the predictive accuracy of the algorithms of the present invention, as described in greater detail below. As used herein "quantized operational parameter data" refers to operational parameter data having a respective identifier that uniquely associates or maps a respective quantization level to a respective operational parameter based on the data buckets for that operational parameter.

Figure 5:
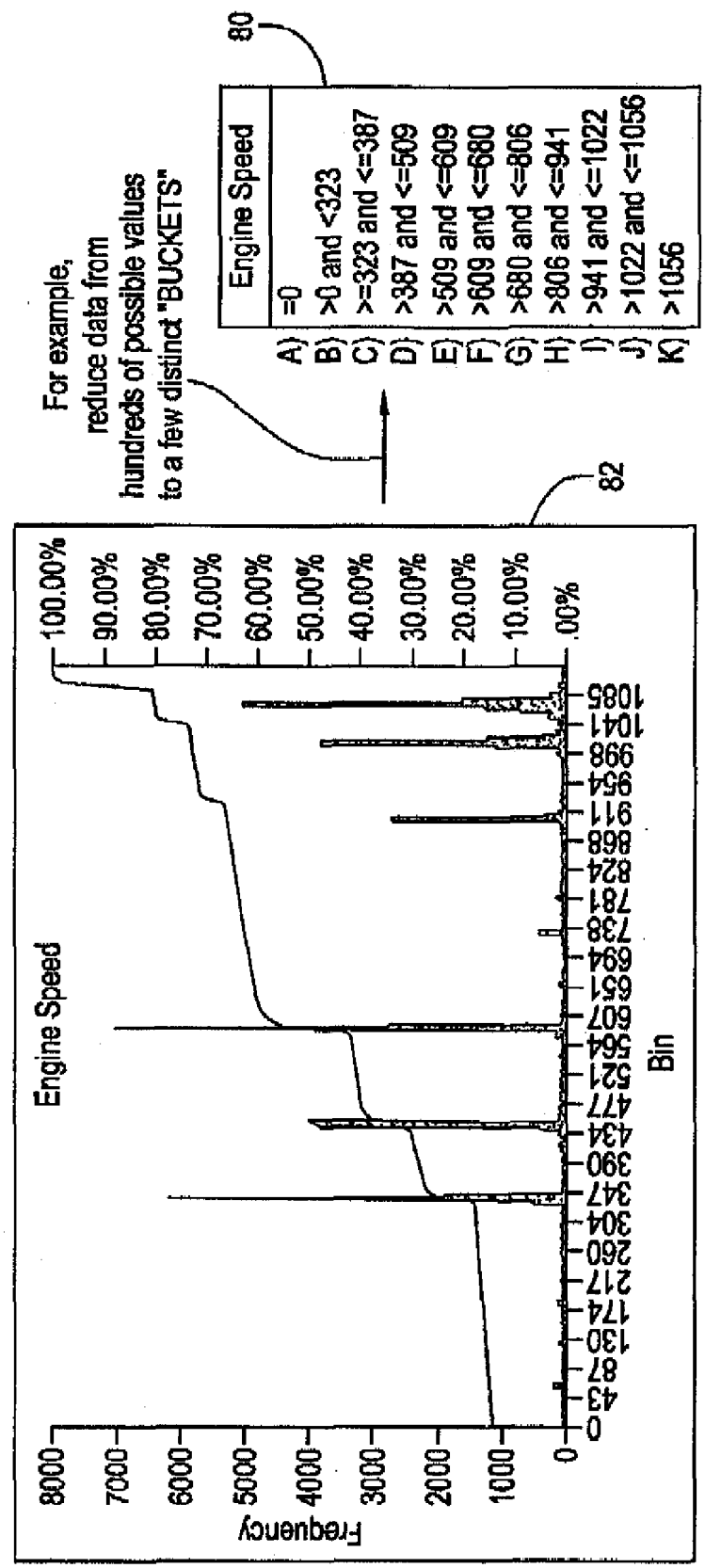
FIG. 5 is a flow chart illustrating one exemplary embodiment of a data bucket for generating quantized operational parameter data.

FIG. 5 illustrates an exemplary data bucket 80 for one exemplary operational parameter, e.g. engine speed. For example, prior to the present invention, conceptually the value of engine speed may fall anywhere in a range from zero rpm to a maximum rated engine speed. In accordance with aspects of the present invention, exemplary data bucket 80, allows for reducing the number of values that may be assumed by engine speed based on statically and/or empirically determined ranges for engine speed. For example, data bucket 80 may be made up of eleven distinct ranges for engine speed, respectively identified in FIG. 5 with the letters A through K. Thus, engine speed of zero rpm would be assigned to range A. Engine speed above zero rpm and less than 323 rpm would be assigned to range B. Engine speed equal or above 323 rpm and equal or less than 387 rpm would be assigned to range C. The inventors of the present invention have innovatively recognized that mapping the value of the operational parameters based on the data bucket of the operational parameter allows reducing the universe of possible states that otherwise could be attributed to each operational parameter. As further illustrated in FIG. 5, the data bucket for engine speed may be based on a histogram 82 that relates distinct faults to engine speed. For example, the histogram may reveal that a first type of fault is statistically more prevalent in speed range D than in any other speed range, or that a second type of fault is statistically more prevalent in speed ranges I through K than in any of the other speed ranges.

Returning to FIG. 4, an exemplary data file 70 may be used for triggering candidate anomalies 27 (FIG. 1) and generate data predictive of malfunctions of the machine. For example, fault code "7096" may be indicative of a respective fault for a fuel pump, code "1020" may represent quantized ambient temperature in a predefined range. Assuming the combination of fault code "7096" and quantized ambient temperature under code "1020" is statistically demonstrated to be predictive of a certain machine malfunction, then when new fault log data is downloaded for the machine, if one encounters that particular combination, then one would be able to predict that particular machine malfunction. Similarly, assuming fault code "7097" is indicative of an inverter fault and code "1060" represents a quantized level of current flowing through a leg of the inverter within a predefined range. In this example, the combination of fault code "7096" and quantized leg current under code "1060" may be statistically demonstrated to be predictive of another machine malfunction, then when new fault log data 200 (FIG. 1) is downloaded from the machine, if one detects that particular combination, then one would be able to predict that particular machine malfunction.

For the sake of clarity of understanding, the foregoing examples of combinations of fault codes and quantized operational parameters were chosen to be relatively straightforward. However, as will be recognized by those skilled in the art, the construction and identification of candidate anomalies may involve searching for combinations of clusters or groups of faults as well as searching for respective combinations of multiple quantized operational parameters, using the analysis techniques disclosed in the foregoing patent applications. More particularly, the combinations of faults clusters that, in accordance with aspects of the invention, may be enhanceable (i.e., optionally enhanced) with quantized operational parameter data to generate data even more highly predictive of malfunctions of the machine. Each predicted malfunction may be correlated with the repair data using statistical correlation techniques well-understood by those skilled in the art. For example, the repair data may include respective repair codes and may further indicate one or more corrective actions to be taken once a specific malfunction is detected. The indication, for example, may be for the operator to disengage a respective hand brake unintentionally activated, or suggest the replacement of a given replaceable unit, or in more complex situations may suggest to the operator to bring the locomotive to a selected repair site where needed specialized tools may be available to perform the repair. Preferably, prior to generating a respective repair code for a predictive malfunction, a respective repair weight should be retrieved from a directed weight data storage unit 26 (FIG. 1) to verify that the predicted malfunction and selected repair meet the respective weight assigned to the predicted malfunction or repair. It will be appreciated that the initial values for the directed weight data may be obtained based on the knowledge of experts and/or empirical data. That is, the values of the directed weight data may be initially assigned. However, as additional cases are used to populate a case data storage unit 24 (FIG. 1), the system may be configured to automatically adjust or adapt the respective values of the directed weight data based on the cumulative knowledge acquired from such additional cases. Similarly, both the quantization levels in the data buckets and the candidate anomalies may be adapted or modified based on the cumulative knowledge extracted from the additional cases.

Figure 6:
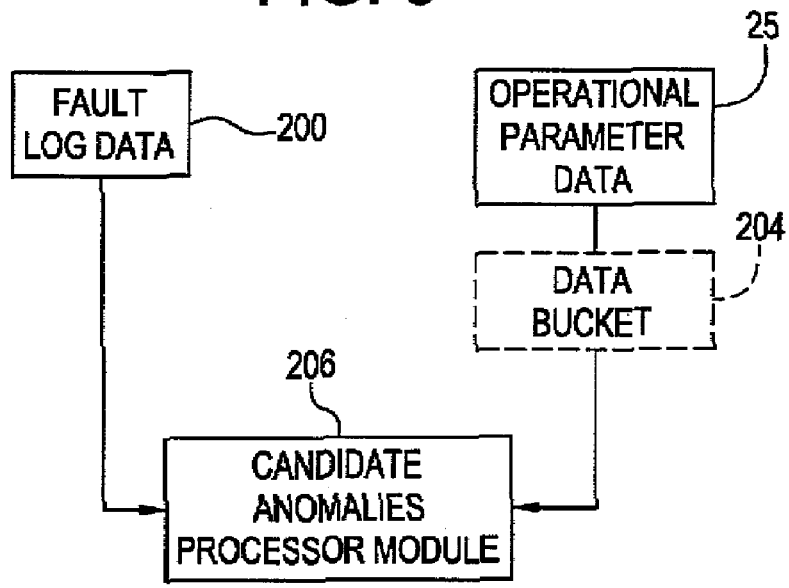
FIG. 6 illustrates further details regarding the processor of FIG. 1.

FIG. 6 illustrates an exemplary embodiment wherein a candidate anomaly processor module 206, which may be part of processor 12, receives fault log data 200 and operational parameter data 25 that may be quantized through a data bucket 204 and mapped as discussed in the context of FIGS. 4 and 5.

Figure 7:
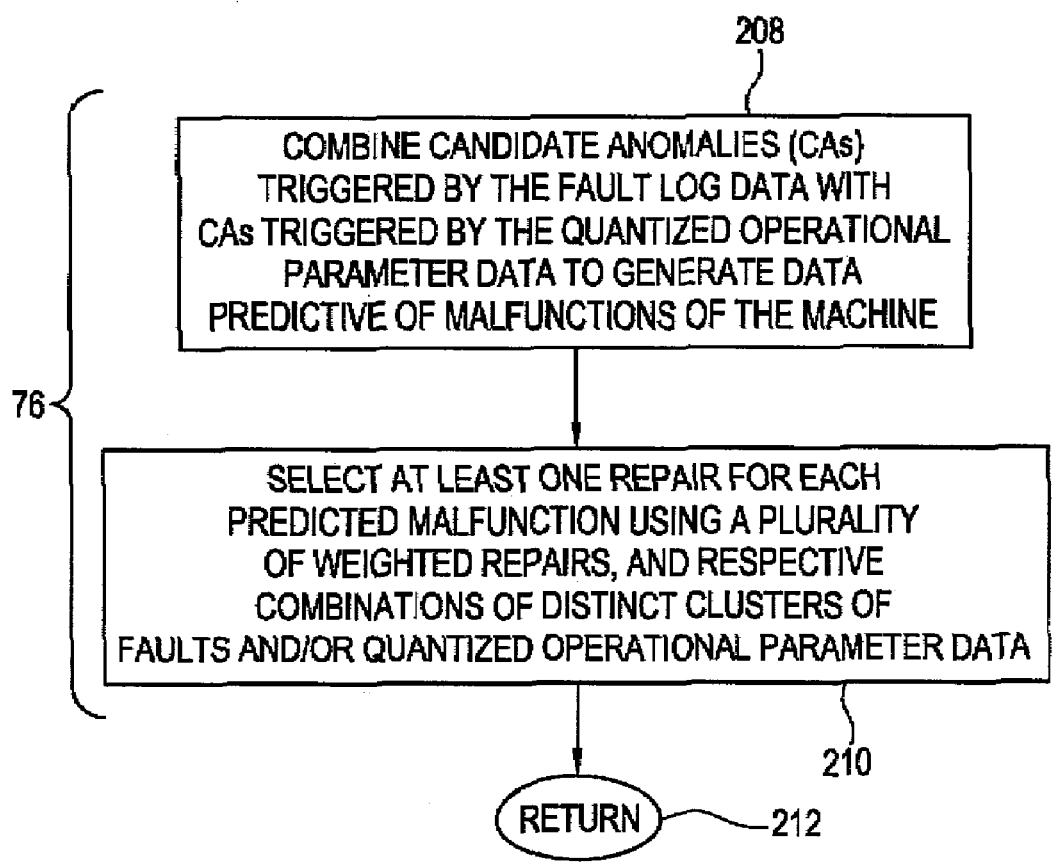
FIG. 7 is a flowchart describing actions for selecting a respective repair for a predicted malfunction upon analysis of the fault data and/or quantized operational parameter data.

FIG. 7 illustrates a flow chart 76 illustrating exemplary processing steps that may be performed by processor module 206. For example, step 208 allows for combining candidate anomalies triggered by the fault log data with candidate anomalies triggered with quantized operational parameter data to generate data predictive of malfunctions of the machine. Prior to return step 212, step 210 allows for selecting at least one repair for each predicted malfunction using a plurality of weighted repairs and, as suggested above, respective combinations of distinct clusters of faults and/or quantized operational parameters.

Figure 8:
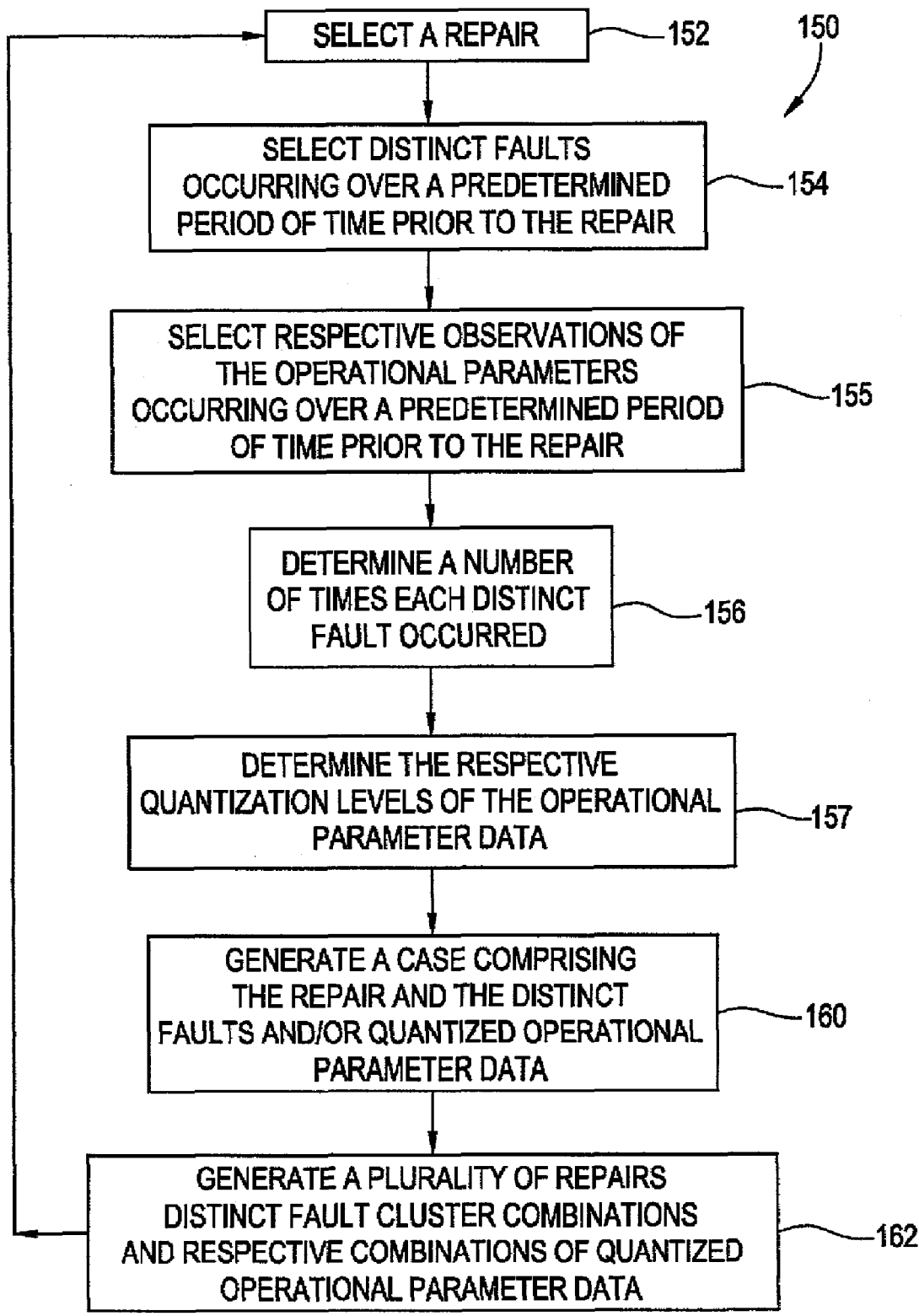
FIG. 8 is flow chart describing actions for generating a plurality of respective cases, including predetermined repairs, fault cluster combinations and/or quantized operational parameter data for each case.

FIG. 8 is a flowchart of an exemplary process 150 embodying aspects of the present invention for selecting or extracting repair data from repair data storage unit 20, fault log data from fault log data storage unit 22, and operational parameter data from operational parameter data storage unit 29 that may be optionally quantized based on the quantization levels stored in data buckets 28 to generate a plurality of diagnostic cases, which are stored in a case storage unit 24. As used herein, the term "case" comprises a repair and one or more distinct faults or fault codes singly or in combination, with respective observations of one or more operational parameters that may be optionally quantized.

With reference still to FIG. 8, process 150 comprises, at 152, selecting or extracting a repair from repair data storage unit 20 (FIG. 1). Given the identification of a repair, the present invention searches fault log data storage unit 22 (FIG. 1) to select or extract, at 154, distinct faults occurring over a predetermined period of time prior to the repair. Similarly, operational parameter data storage unit 29 (FIG. 1) may be searched to select or extract, at 155, respective observations of the operational parameter data occurring over a predetermined period of time prior to the repair. Once again, the observations may include snapshot observations, or may include substantially continuous observations that would allow for detecting trends that may develop over time in the operational parameter data and that may be indicative of malfunctions in the machine. The predetermined period of time may extend from a predetermined date prior to the repair to the date of the repair. Desirably, the period of time extends from prior to the repair, e.g., 14 days, to the date of the repair. It will be appreciated that other suitable time periods may be chosen. The same period of time may be chosen for generating all of the cases.

At 156, the number of times each distinct fault occurred during the predetermined period of time is determined. At 157, the respective quantization values of the observations of the operational parameters is determined, such as may be performed with data buckets 28. A plurality of repairs, one or more distinct fault cluster and respective quantization values of the operational parameters may be generated and stored as a case, at 160. For each case, a plurality of repair, respective fault cluster combinations, and respective combinations of clusters of quantized observations of the operational parameters is generated at 162.

Figure 9:
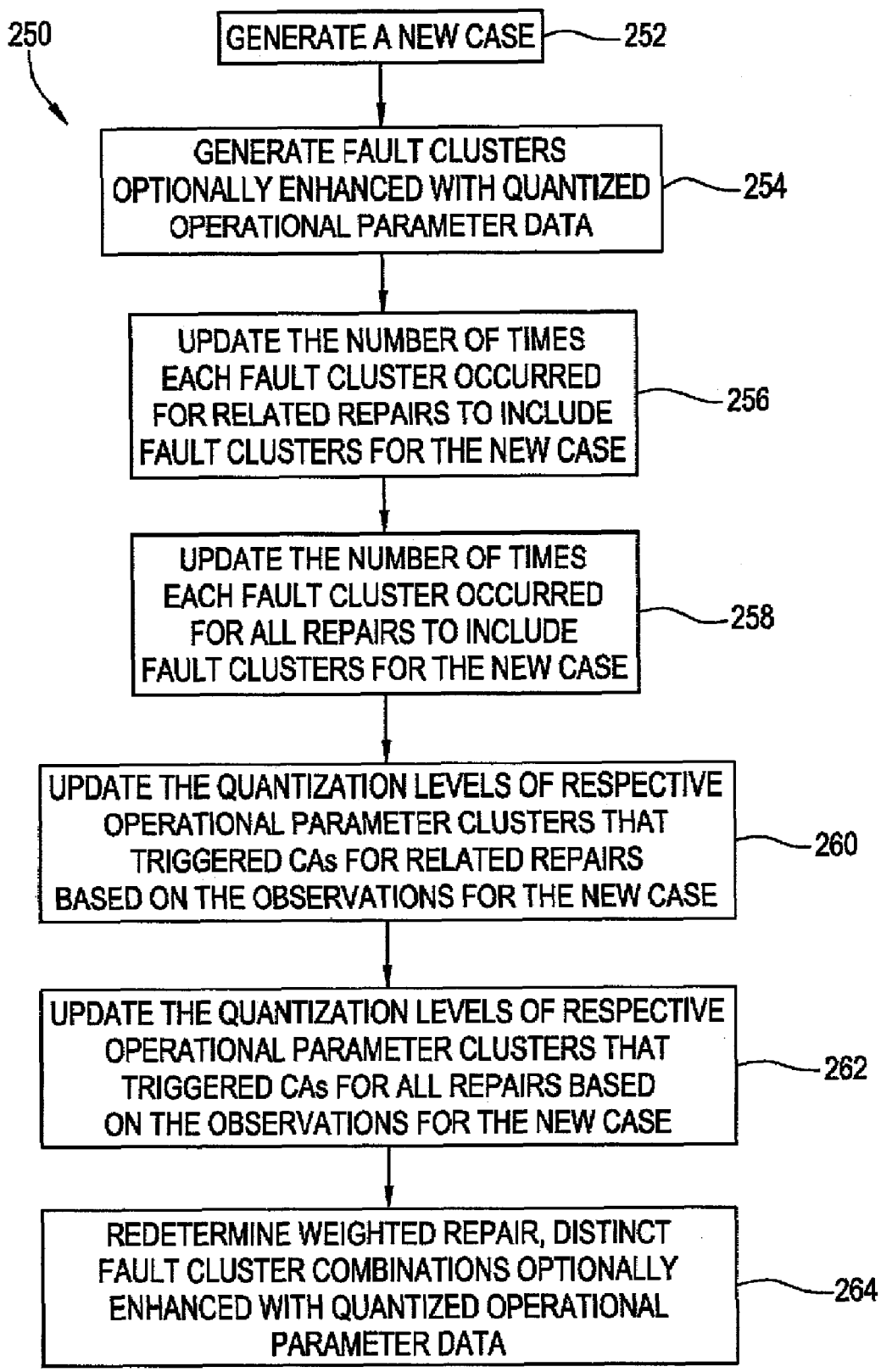
FIG. 9 is a flowchart describing the steps for adding a new case to the case database and updating the weighted repair, distinct fault cluster combinations and respective weights for candidate anomalies.

As shown in FIG. 9, a process 250 embodying aspects of the present invention provides for updating directed weight data storage unit 26 to include one or more new cases. For example, once a new case is generated, a new repair, fault log data, and operational parameter data from a malfunctioning locomotive is received at 252. At 254, a plurality of distinct fault cluster combinations and clusters of observations of the operational parameters is generated. In accordance with aspects of the invention, the fault cluster may be configurable in at least one of the following cluster configurations: a stand-alone fault cluster configuration and a cluster configuration enhanced with quantized operational parameter data.

The number of times each fault cluster occurred for related repairs is updated at 256 and the number of times each fault cluster occurred for all repairs are updated at 258. Similarly, respective quantization levels of the clusters of observations of the operational parameters that triggered respective candidate anomalies for related repairs may be averaged and updated at 260 and respective quantization levels of the operational parameters that triggered respective candidate anomalies for all repairs may be averaged and updated at 262. Thereafter, the weighted repair, the distinct fault cluster combinations and the respective weight values for the candidate anomalies are redetermined at 264. For example, although a candidate anomaly may have initially suggested that if the engine water temperature exceeds the engine oil temperature by $T_1°$ C., and if the water temperature is above $T_2°$ C., then the candidate anomaly would declare a cooling subsystem malfunction. However consistent with the adaptive features of the present invention, at step 260, the learning algorithm would conveniently allow for redetermining the respective temperature values required to trigger the candidate anomaly, in view of the accumulated knowledge gained from each new case. In addition, the candidate anomalies themselves could be modified to add observations of new parameters or delete observations from parameters that were initially believed to be statistically meaningful but in view of the cumulative knowledge acquired with each new case are proven to be of little value for triggering a respective candidate anomaly, i.e., equivalent to a "Don't Care" variable in Boolean logic. As suggested above, further analysis of the repair data could indicate that ambient temperature may be another parameter that could aid the candidate anomaly to trigger more accurately the prediction of malfunctions of the cooling subsystem. In essentially the same manner the data buckets may be adjusted so that the quantization levels originally assigned to any given parameter may be adjusted in view of the cumulative knowledge acquired with each new case.

As noted above, the system provides prediction of malfunctions and repair selection from hybrid analysis of fault log data and operational parameter data from a malfunctioning machine. Desirably, after verification of the repair(s) for correcting a malfunction the new case can be inputted and updated into the system.

From the present invention, it will be appreciated by those skilled in the art that the repair, respective fault cluster combinations and observations of operational parameters may be generated and stored in memory when generating the weights therefor, or alternatively, be stored in either the case data storage unit, directed weight storage unit, or a separate data storage unit.

Thus, the present invention provides in one aspect thereof, a method and system for automatically harvesting potentially valid diagnostic cases by interleaving repair, fault log data which is not restricted to sequential occurrences of faults or error log entries and operational parameter data that could be made up of snapshot observations and/or substantially continuous observations, that could be assigned respective quantization levels that essentially allow to transform such observations into fault-like indications that may be processed to enhanced the predictive accuracy of the system. In another aspect, standard diagnostic fault clusters and suitable candidate anomalies using operational parameters and/or fault data can be generated in advance so they can be identified across all cases and their relative occurrence tracked.

The present invention further allows readjusting the assigned weights to the repairs, the candidate anomalies and the data buckets based on extracting knowledge is accumulated as each new case is closed.

In addition, when initially setting up case data storage unit 24, a field engineer may review each of the plurality of cases to determine whether the collected data, either fault log data and/or operational parameter data, provide a good indication of the repair. If not, one or more cases can be excluded or removed from case data storage unit 24. This review by a field engineer would increase the initial accuracy of the system in assigning weights to the repair, candidate malfunctions and fault cluster combinations.

Figure 10:
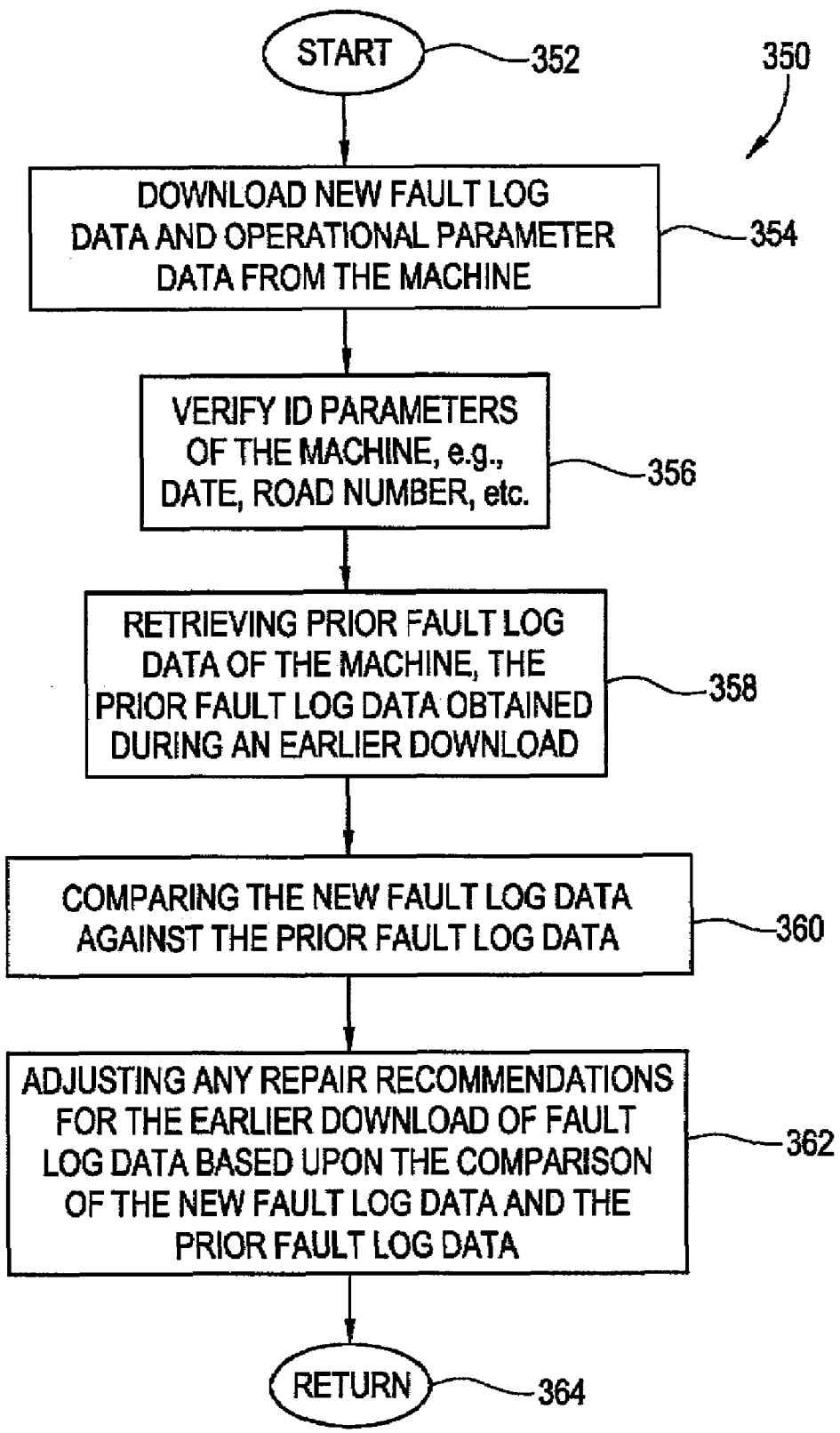
FIG. 10 is a flow chart of an exemplary of the process of the present invention for analyzing fault log data enhanceable with quantized operational parameter data so as to identify respective faults and/or fault combinations and/or operational conditions predictive of equipment malfunctions.
Figure 11:
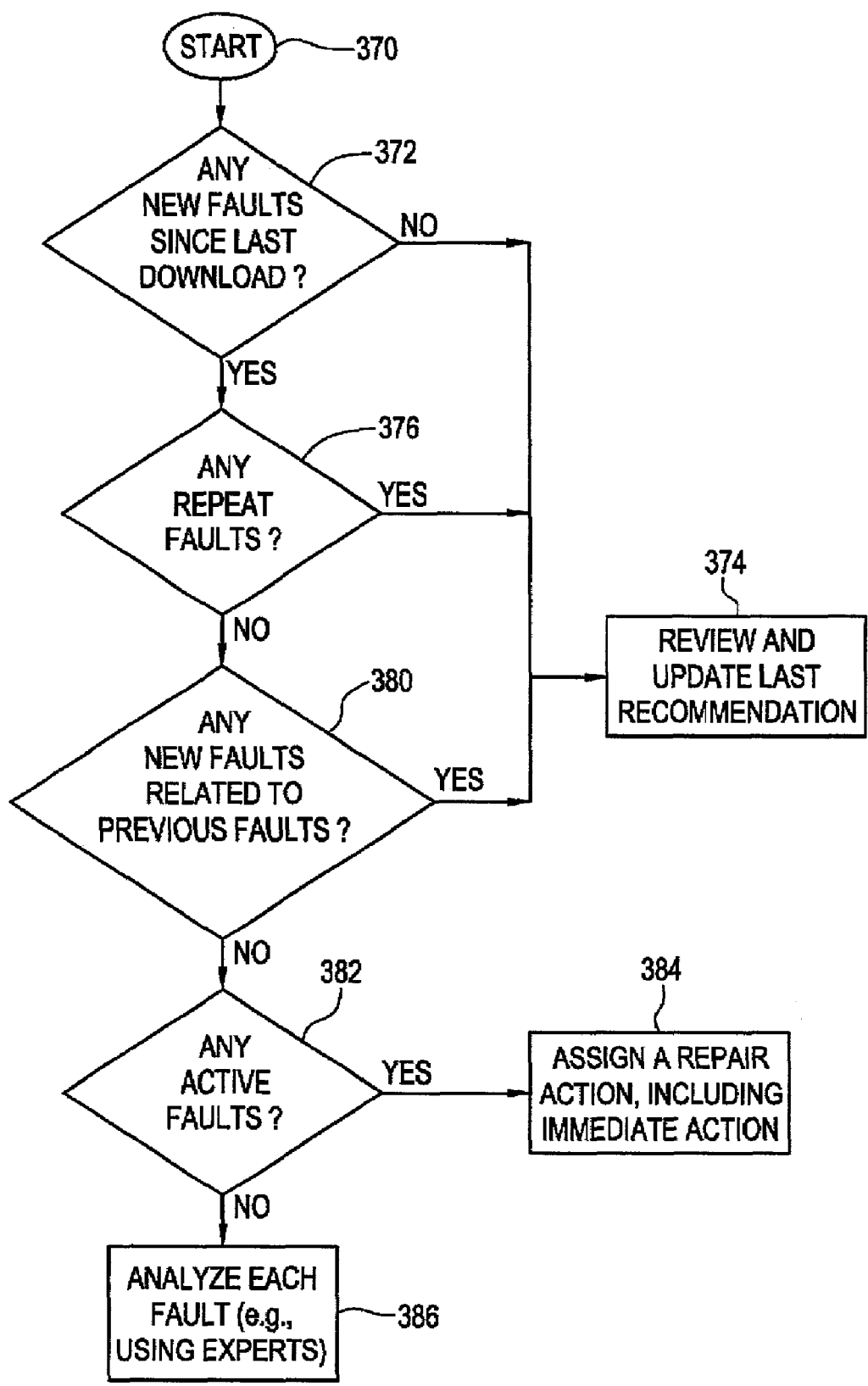
FIG. 11 is a flow chart illustrating further details in connection with the process of FIG. 10.

It is specifically contemplated that the fault log data referred to in the context of FIGS. 10–12, may be optionally enhanced with quantized operational parameter data. Thus, one may interchangeably use the expression "fault log data optionally enhanced with quantized operational parameter data with the expression "fault log data". FIG. 10 shows a flow chart of an exemplary embodiment of a process 350 for analyzing fault log data so as to avoid missing detection or identification of fault log data and/or operational parameter data which are statistically and probabilistically relevant to early and accurate prediction of machine malfunctions. Upon start of operations at step 352, step 354 allows for downloading new fault log data and operational parameter data from the machine. Step 356 allows for verifying predetermined identification parameters of the newly downloaded fault log data so as to avoid unintentionally attributing faults to the wrong locomotive. Exemplary identification parameters may include road number, time of download, time fault was logged, etc. For example, this step may allow for verifying that the road number in a previously downloaded fault log actually matches the road number of the locomotive fault log presently intended to be downloaded and may further allow for verifying that the date and time in the fault log matches the present date and time. Step 358 allows for retrieving prior fault log data of the machine. The prior fault log may be obtained during an earlier download, such as the last download executed prior the download of step 354. As described in greater detail in the context of FIG. 11 below, step 360 allows for comparing the new fault log data against the prior fault log data. Prior to return step 364, step 362 allows for adjusting any repair recommendations for the earlier download of fault log data based upon the comparison of the new fault log data and the prior fault log data.

FIG. 11 is a flowchart that illustrates further details regarding process 350 (FIG. 10). Subsequent to start step 370, step 372 allows for determining whether any new faults have occurred since the last download. If new faults have not been logged since the last download, then step 374 allows for reviewing and updating the last repair recommendation. If new faults were logged at step 372, then step 376 allows for determining whether any of the new faults are repeats of the previously logged faults, e.g., faults that previously required a recommendation.

If there are repeat faults, then, as suggested above, step 374 would allow for reviewing and updating the last repair recommendation. If there are no repeat faults, then step 380 allows for determining if the newly downloaded faults are related to any previously logged faults. By way of example and not of limitation, related faults generally affect the same machine subsystem, such as power grid faults and dynamic braking faults, both generally related to the dynamic braking subsystem of the locomotive. If the newly downloaded faults are related to previously logged faults, then once again, step 374 would allow for reviewing and updating the last repair recommendation. Step 382 allows for determining whether there are any active faults. If there are active faults, then step 384 allows for assigning a respective repair action. For example, the repair assignment may require to determine if the locomotive engineer should reset the faults, or if the locomotive should be checked first by one or more repair specialists. By way of example, any open or non-faults will show 0.00 in the reset column. An externally set of instructions, such as may be contained in a fault analysis electronic database or hardcopy may be conveniently checked so as to determine whether any given fault is the type of fault that could result in locomotive damage if reset prior to conducting detailed investigation as to the cause of that fault. If no faults are active, then step 386 allows for conducting expert analysis on the fault. By way of example and not of limitation, the expert analysis may be performed by teams of experts who preferably have a reasonably thorough understanding of respective subsystems of the locomotive and their interaction with other subsystems of the locomotive. For example, one team may address fault codes for the traction subsystem of the locomotive. Another team may address faults for the engine cooling subsystem, etc. As suggested above, each of such teams may also interact with the diagnostics experts in order to insure that the newly identified faults and/or respective combinations thereof are fully compatible with any of the diagnostics techniques used for running diagnostics on any given locomotive.

FIG. 12 is a flowchart of an exemplary process 450 for selecting or extracting repair data from repair data storage unit 20, fault log data from fault log data storage unit 22, and operational parameter data from operational parameter data storage unit 29 and generating a plurality of diagnostic cases, which are stored in a case storage unit 24. As used herein, the term "case" comprises a repair and one or more distinct faults or fault codes in combination with respective observations of one or more operational parameters.

With reference still to FIG. 12, process 450 comprises, at 452, selecting or extracting a repair from repair data storage unit 20 (FIG. 1). Given the identification of a repair, one searches fault log data storage unit 22 (FIG. 1) to select or extract, at 454, distinct faults occurring over a predetermined period of time prior to the repair. Similarly, operational parameter data storage unit 29 (FIG. 1) may be searched to select or extract, at 455, respective observations of the operational parameter data occurring over a predetermined period of time prior to the repair. Appropriate quantization levels may be retrieved from data buckets 28. Once again, the observations may include snapshot observations, or may include substantially continuous observations that would allow for detecting trends that may develop over time in the operational parameter data and that may be indicative of malfunctions in the machine. The predetermined period of time may extend from a predetermined date prior to the repair to the date of the repair. Desirably, the period of time extends from prior to the repair, e.g., 14 days, to the date of the repair. It will be appreciated that other suitable time periods may be chosen. The same period of time may be chosen for generating all of the cases.

At 456, the number of times each distinct fault occurred during the predetermined period of time is determined. At 457, the respective quantization levels of the observations of the operational parameters may be determined. A plurality of repairs, one or more distinct fault cluster and respective quantized observations of the operational parameters may be generated and stored as a case, at 460. For each case, a plurality of repair, respective fault cluster combinations, and/or respective combinations of clusters of quantized operational parameter data is generated at 462.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, flash memories, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for processing fault log data from a machine comprising a plurality of respective pieces of equipment, the method further processing operational parameter data indicative of operational end/or environmental conditions for the respective pieces of equipment, the method comprising:
   collecting fault log data comprising a plurality of faults from any malfunctioning piece of equipment;
   collecting operational parameter data relatable to each respective time of occurrence of the plurality of faults from the malfunctioning equipment;
   identifying a plurality of distinct faults in the fault log data;
   identifying a plurality of data buckets indicative of respective levels of each operational parameter;
   generating at least one distinct fault cluster from the plurality of distinct faults;
   relating to each generated fault cluster a respective quantization of at least one operational parameter to provide at least one fault cluster configurable in at least one of the following cluster configurations: a stand-alone fault cluster configuration and a cluster configuration enhanced with quantized operational parameter data;
   generating a plurality of weighted repair and distinct fault cluster combinations enhanceable with quantized operational parameter data, wherein each of the plurality of weighted repair and distinct fault cluster combinations is generated from a plurality of cases, each case comprising a repair and at least one distinct fault enhanceable with quantized operational parameter data;
   determining a respective weight for each of the plurality of weighted repair and distinct fault cluster combinations enhanced with quantized operational parameter data, wherein said weight is determined by:
   counting the number of times a respective fault cluster combination with quantized operational parameter data sharing a common quantization level for at least one operational parameter occurs in cases comprising related repairs;
   counting the total number of times the combination with the common quantization level occurs in said plurality of cases; and
   computing the ratio of the counted number of times the combination occurs in cases comprising related repairs over the counted number of times the combination occurs in the plurality of cases; and
   identifying at least one repair for the at least one fault cluster enhanced with quantized operational parameter data using the plurality of weighted repair and distinct fault cluster combinations enhanceable with quantized operational parameter data.

2. The method of claim 1 wherein the operational parameter data comprises a plurality of snapshot observations of operational parameters from the pieces of equipment.

3. The method of claim 2 wherein the respective snapshot observations of operational parameters from the machine and the logging of respective faults from the machine are temporally aligned relative to one another.

4. The method of claim 1 wherein the operational parameter data comprises a plurality of continuous observations of operational parameters from the machine.

5. The method of claim 4 wherein the respective continuous observations of operational parameters from the machine and the logging of respective faults from the machine are temporally co-relatable to one another.

6. A method for processing fault log data from a machine comprising a plurality of respective pieces of equipment, the method further processing operational parameter data indicative of operational and/or environmental conditions for the respective pieces of equipment, the method comprising:
   collecting fault log data comprising a plurality of faults from any malfunctioning piece of equipment;
   collecting operational parameter data relatable to each respective time of occurrence of the plurality of faults from the malfunctioning equipment;
   identifying a plurality of distinct faults in the fault log data;
   identifying a plurality of data buckets indicative of respective levels of quantization of each operational parameter, wherein each data bucket is configured to distinguish measurable influences on the performance of a given piece of equipment based on to the quantization level of each operational parameter;
   generating at least one distinct fault cluster from the plurality of distinct faults;
   relating to each generated fault cluster a respective quantization level of at least one operational parameter to provide at least one fault cluster configurable in at least one of the following cluster configurations: a stand-alone fault cluster configuration and a cluster configurations enhanced with quantized operational parameter data;
   predicting at least one repair for the at least one fault cluster using a plurality of weighted repair and distinct fault cluster combinations enhanceable with quantized operational parameter data, wherein each of the plurality of weighted repairs and distinct fault cluster combinations is generated from a plurality of cases, each case comprising a repair and at least one distinct fault enhanced with quantized operational parameter data, and further wherein each of the plurality of weighted repair and distinct fault cluster combinations is assigned a weight, wherein said weight is determined by dividing the number of times a respective fault cluster combination sharing a common quantization level for at least one operational parameter occurs in cases comprising related repairs by the total number of times that combination occurs in said plurality of cases.

7. A system for processing fault log data from a machine comprising a plurality of respective pieces of equipment, the system further processing operational parameter data indicative of operational and/or environmental conditions for the respective pieces of equipment, the system comprising:
   a database for collecting fault log data comprising a plurality of faults from any malfunctioning piece of equipment;

a database for collecting operational parameter data relatable to each respective time of occurrence of the plurality of faults from the malfunctioning equipment;

a processor configured to identify a plurality of distinct faults in the fault log data;

a processor configured to identify a plurality of data buckets indicative of respective levels of quantization of each operational parameter;

a processor configured to generate at least one distinct fault cluster from the plurality of distinct faults;

a processor configured to relate to each generated fault cluster a respective quantization level of at least one operational parameter to provide at least one fault cluster configurable in at least one of the following cluster configurations: a stand-alone fault cluster configuration and a cluster configuration enhanced with quantized operational parameter data;

a processor configured to generate a plurality of weighted repair and distinct fault cluster combinations enhanceable with quantized operational parameter data, wherein each of the plurality of weighted repair and distinct fault cluster combinations is generated from a plurality of cases, each case comprising a repair and at least one distinct fault enhanceable with quantized operational parameter data;

a processor configured to determine a respective weight for each of the plurality of weighted repair and distinct fault cluster combinations enhanced with quantized operational parameter data, wherein said weight is determined by dividing the number of times a respective fault cluster combination with quantized operational parameter data sharing a common quantization level for at least operational parameter occurs in cases comprising related repairs by the total number of times the combination with the common quantization level occurs in said plurality of cases; and a processor configured to identify at least one repair for the at least one fault cluster using the plurality of weighted repair and distinct fault cluster combinations enhanceable with quantized operational parameter data.

8. The system of claim 7 wherein the operational parameter data comprises a plurality of snapshot observations of operational parameters from the pieces of equipment.

9. The system of claim 8 wherein the respective snapshot observations of operational parameters from the machine and the logging of respective faults from the machine are temporally aligned relative to one another.

10. The system of claim 7 wherein the operational parameter data comprises a plurality of continuous observations of operational parameters from the machine.

11. The system of claim 10 wherein the respective continuous observations of operational parameters from the machine and the logging of respective faults from the machine are temporally co-relatable to one another.

12. An article of manufacturing comprising a computer-readable medium including computer-readable program code for causing a computer to process fault log data from a machine comprising a plurality of respective pieces of equipment, the computer-readable program code further causing- the computer to process operational parameter data indicative of operational and/or environmental conditions for the respective pieces of equipment, the computer-readable program code in said article of manufacturing comprising:

computer-readable program code configurable to collect fault log data comprising a plurality of faults from any malfunctioning piece of equipment:

computer-readable program code configurable to collect operational parameter data relatable to each respective time of occurrence of the plurality of faults from the malfunctioning equipment;

computer-readable program code configurable to identify a plurality of distinct faults in the fault log data;

computer-readable program code configurable to identify a plurality of data buckets indicative of respective levels of quantization of each operational parameter, wherein each data bucket is configurable to distinguish measurable influences on the performance of a given piece of equipment based on to the quantization level of each operational parameter;

computer-readable program code configurable to generate at least one distinct fault cluster from the plurality of distinct faults;

computer-readable program code configurable to relate to each generated fault cluster a respective quantization level of at least one operational parameter to provide at least one fault cluster configurable in at least one of the following cluster configurations: a stand-alone fault cluster configuration and a cluster configuration enhanced with quantized operational parameter data; and computer-readable program code configurable to predict at least one repair for the at least one fault cluster using a plurality of weighted repair and distinct fault cluster combinations enhanceable with quantized operational parameter data, wherein each of the plurality of weighted repair and distinct fault cluster combinations is generated from a plurality of cases, each case comprising a repair and at least one distinct fault enhanceable with quantized operational parameter data, and further wherein each of the plurality of weighted repair and distinct fault cluster combinations enhanced with quantized operational parameter data is assigned a weight, wherein said weight is determined by dividing the number of times the combination occurs in cases comprising related repairs by the total number of times a respective fault cluster combination sharing a common quantization level occurs in said plurality of cases.

* * * * *